(12) United States Patent
Day et al.

(10) Patent No.: US 7,530,638 B2
(45) Date of Patent: May 12, 2009

(54) DUAL ACTION SEAT RELEASE MECHANISM

(75) Inventors: Robert Christopher Day, Whitmore Lake, MI (US); Vikas Bhatia, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 227 days.

(21) Appl. No.: 11/217,172

(22) Filed: Sep. 1, 2005

(65) Prior Publication Data
US 2007/0046091 A1 Mar. 1, 2007

(51) Int. Cl.
*B60N 2/02* (2006.01)

(52) U.S. Cl. ............................. 297/378.12; 297/378.1; 297/367

(58) Field of Classification Search ............... 297/378.1, 297/378.12, 378.13, 367, 463.1; 292/35; 74/506
See application file for complete search history.

(56) References Cited

U.S. PATENT DOCUMENTS

| 5,788,324 | A | | 8/1998 | Shea et al. | |
| 7,036,885 | B2 | * | 5/2006 | Ganot et al. | 297/378.12 |
| 2003/0197410 | A1 | * | 10/2003 | Blair et al. | 297/378.12 |
| 2006/0097560 | A1 | * | 5/2006 | Keyser et al. | 297/378.12 |

FOREIGN PATENT DOCUMENTS

| GB | 2144511 A | * | 3/1985 |
| JP | 1990-41835 | | 3/1990 |
| JP | 2000-108737 | | 4/2000 |

* cited by examiner

*Primary Examiner*—Laurie K Cranmer
(74) *Attorney, Agent, or Firm*—Gifford, Krass, Sprinkle, Anderson & Citkowski, P.C.

(57) ABSTRACT

A dual action seat release mechanism for a seat on a vehicle includes a seat assembly having a vertically oriented seat back portion pivotally connected to a horizontally oriented seat cushion portion. A lever is pivotally attached to the seat assembly, and includes an elongated handle extending from a disc-shaped portion, and a center of the disc-shaped portion is pivotally attached to the seat assembly. A cable attachment means is disposed on the disc-shaped portion of the lever, and is positioned radially outboard from the center of the disc-shaped portion. A cable having a first end and a second end is provided and the first end of the cable is attached to the cable attachment means on the lever. A cable support bracket for fixedly supporting the cable is fixedly attached to the seat assembly. A cable routing bracket for routing the cable is fixedly attached to the seat assembly, and includes an elongated channel for receiving the cable. A seat back release mechanism for unlocking the seat back from the seat cushion portion of the seat is provided, and a second end of the cable is operatively attached to the seat back release mechanism, such that rotation of the lever in a first direction releases the seat back release mechanism for rotation of the seat back in the first direction of rotation, and rotation of the lever in a second direction releases the seat back release mechanism for rotation of the seat back in the second direction of rotation.

12 Claims, 2 Drawing Sheets

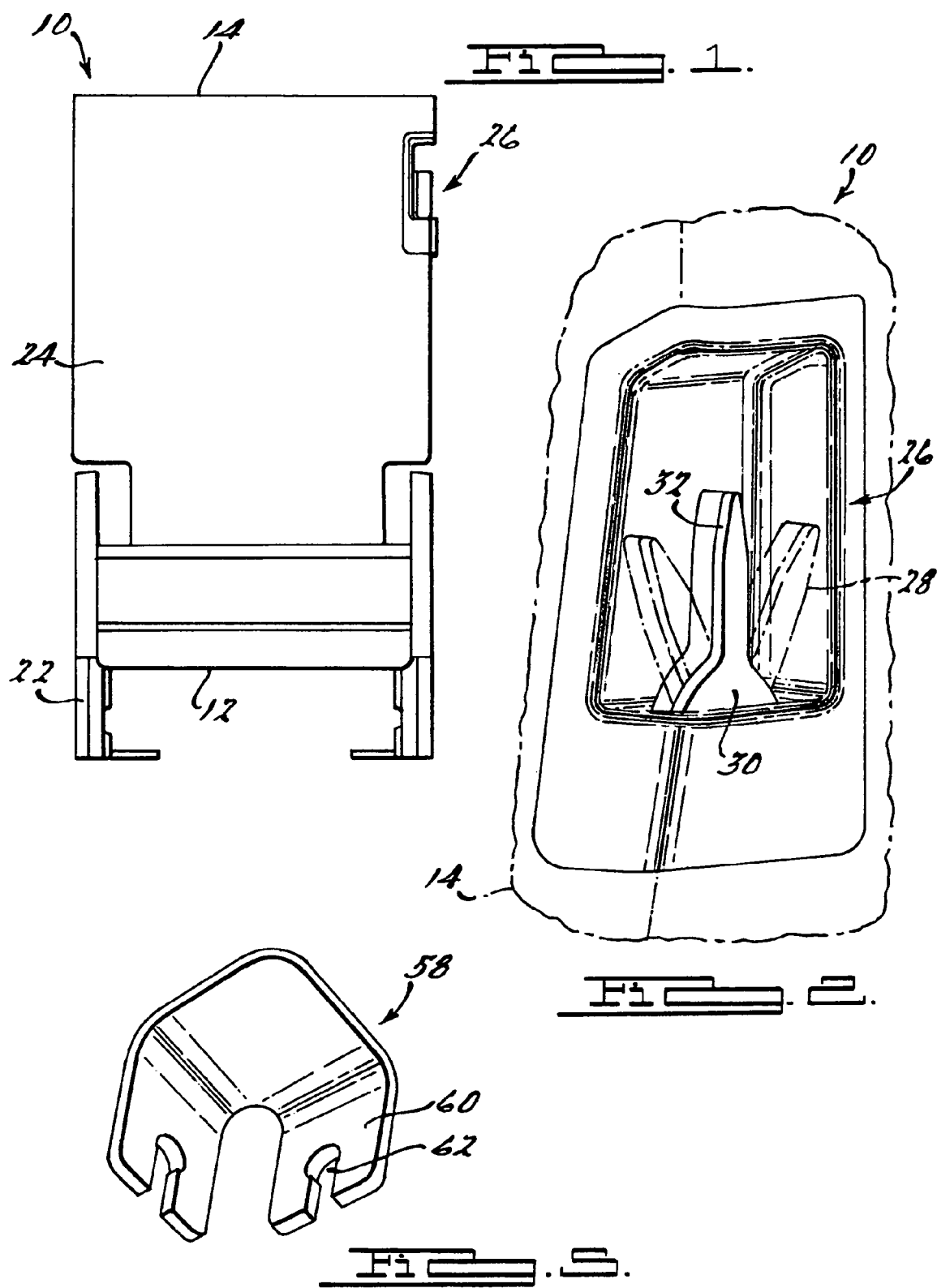

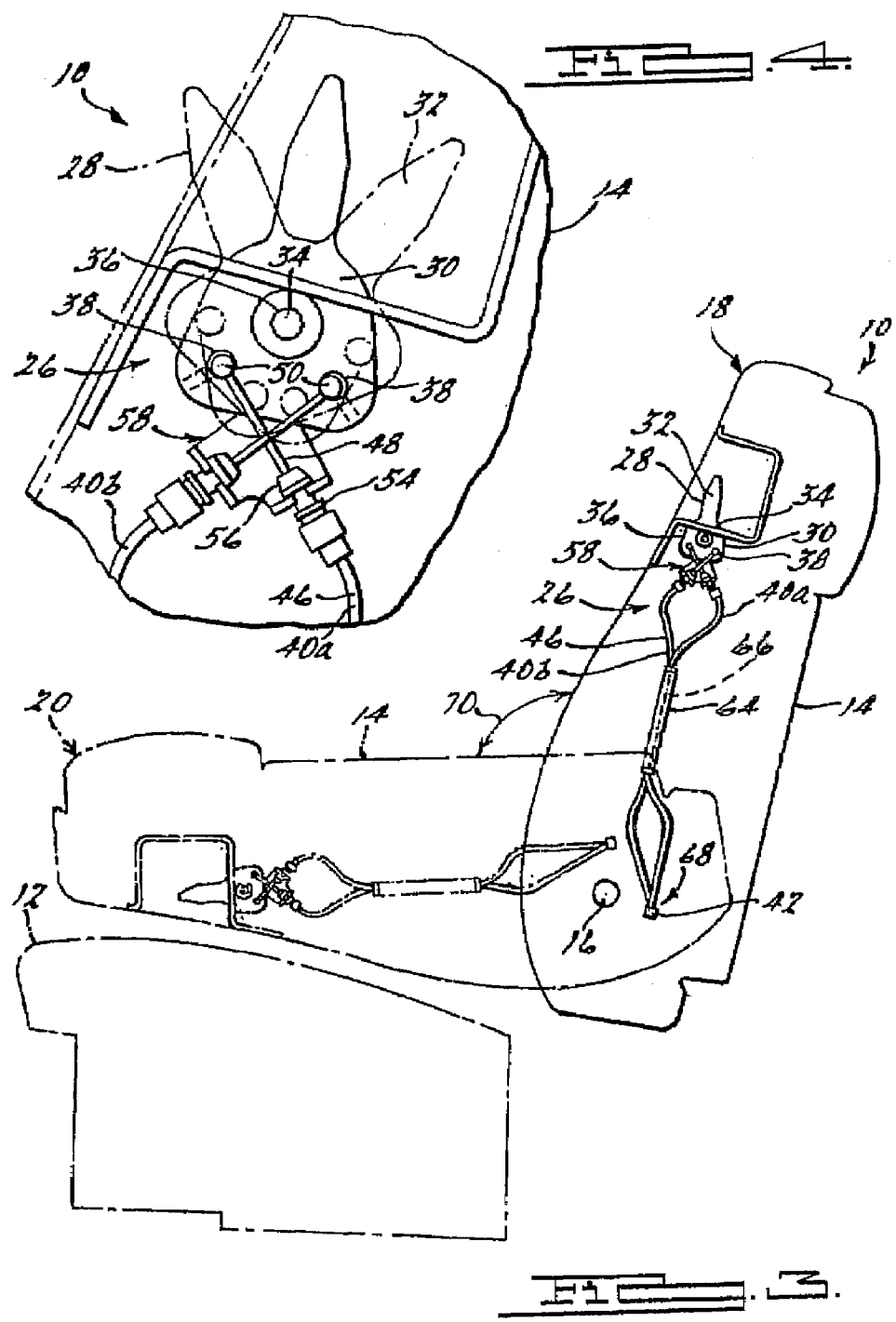

DUAL ACTION SEAT RELEASE MECHANISM

BACKGROUND OF THE INVENTION

1. Field of the Invention

The present invention relates generally to seats in vehicles, and more specifically, to a dual action release mechanism for a seat.

2. Description of the Related Art

Vehicles, such as motor vehicles, frequently include seats that are multi-positional. The seat assembly includes a horizontally oriented seat cushion portion connected to a vertically oriented seat back portion. The seat back is multi-positional, that is, it can assume various positions, such as an upright position, a folded flat position, or a reclined position. The seat back position is typically controlled by a seat release mechanism. One example of a seat release mechanism is a lever that is actuated by a user to reposition the seat back in a desired manner. Another example of a seat release mechanism is a strap.

Repositioning of the seat back generally requires two separate operations. For example, one operation involves actuating the seat release mechanism, and the second operation involves physically moving the seat back into the desired position. While this system works, it involves two hands and two operations. Another system achieves a one directional one-touch operation of the seat back by utilizing a strap to release the seat back locking mechanism and pull the seat back from an upright position to a folded flat position. To return the seat to the upright position, a lever is utilized to release the locking mechanism in order to pull the seat back to the upright position. While this system is functional, it requires that the user know whether to pull the strap or actuate the lever. Another feature of both of these systems is that access to the lever is limited to one side of the seat.

Thus, there is a need in the art for a simplified seat back release mechanism for a vehicle that provides for one-touch operation of the seat back in all directions of seat rotation.

SUMMARY OF THE INVENTION

Accordingly, the present invention is a dual action seat release mechanism for a vehicle. The dual action seat release mechanism includes a seat assembly having a vertically oriented seat back portion pivotally connected to a horizontally oriented seat cushion portion. A lever is pivotally attached to the seat assembly, and includes an elongated handle extending from a disc-shaped portion, and a center of the disc-shaped portion is pivotally attached to the seat assembly. A cable attachment means is disposed on the disc-shaped portion of the lever, and is positioned radially outboard from the center of the disc-shaped portion. A cable having a first end and a second end is provided and the first end of the cable is attached to the cable attachment means on the lever. A cable support bracket for fixedly supporting the cable is fixedly attached to the seat assembly. A cable routing bracket for routing the cable is fixedly attached to the seat assembly, and includes an elongated channel for receiving the cable. A seat back release mechanism for unlocking the seat back from the seat cushion portion of the seat is provided, and a second end of the cable is operatively attached to the seat back release mechanism, such that rotation of the lever in a first direction releases the seat back release mechanism for rotation of the seat back in the first direction of rotation, and rotation of the lever in a second direction releases the seat back release mechanism for rotation of the seat back in the second direction of rotation.

One advantage of the present invention is that a dual action seat release mechanism is provided that allows for one-touch operation of a seat back. Another advantage of the present invention is that one-touch operation of the seat back is provided regardless of seat back initial position. Still another advantage of the present invention is that the lever provides for ergonomic operation of the multi-positional seat back. A further advantage of the present invention is that the operation of the seat back is intuitive, since the direction of rotation of the lever is the same as the desired rotation of the seat back. A further advantage of the present invention is that the seat back release lever is accessible from either side of the seat. Still a further advantage of the present invention is that the seat assembly has fewer components, resulting in lower cost and less complexity to manufacture and maintain.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a seat assembly with a dual action seat release mechanism, according to the present invention.

FIG. 2 is a partial side view of the seat assembly of FIG. 1, according to the present invention.

FIG. 3 is a side view of a seat assembly with a dual action seat release mechanism in an upright and folded down position, according to the present invention.

FIG. 4 is an enlarged perspective view of the dual action seat release lever, according to the present invention.

FIG. 5 is a perspective view of a cable support bracket for the seat assembly of FIG. 1, according to the present invention.

DESCRIPTION OF THE PREFERRED EMBODIMENT(S)

Referring to FIGS. 1-5, a dual action seat release mechanism for a seat assembly is provided. The seat assembly 10 is utilized within a vehicle, such as an automotive vehicle.

The seat assembly 10 includes a generally horizontal seat cushion portion 12 and a generally vertically oriented seat back portion 14, which is pivotally connected by a suitable means to the seat cushion portion 12 at a seat back pivot axis, as shown at 16. It should be appreciated that the seat assembly 10 is multi-positional. An upright position of the seat back is illustrated in FIG. 4 at 18, and a folded down position of the seat back is illustrated in FIG. 3 at 20. The seat assembly 10 may include various other features. For example, the seat assembly 10 may be further unlatched from the vehicle to "tumble" forward. The seat assembly 10 may also be removable from the vehicle. The seat assembly 10 may fold flat into the floor of the vehicle. These features of the seat advantageously enhance the flexibility of the vehicle. For example, there is improved ingress into the vehicle or egress from the vehicle by repositioning of the seat back. Also, there is flexible cargo space. In addition to these features, the seat assembly may also include an armrest pivotally attached to the seat back portion using a suitable attachment means.

The seat back 14 and seat cushion 12 portion of the seat assembly 10 each include a frame 22, a padded portion covering a forward portion of the frame (not shown), and an outer cover 24 over the padded portion. The padded portion is preferably made from a foam material, and the outer cover 24 is a fabric material, leather material, vinyl material or the like. The seat frame 22 is fixedly attached by a suitable means to the vehicle.

The seat assembly 10 also includes a dual action release mechanism 26 pivotally secured to the seat back 14 in this example using a suitable means. The dual action release mechanism advantageously allows pivotal movement of the seat back in multi-directions, using one operation. The dual action release mechanism 26 includes a lever 28 having a disc-shaped center portion 30, and an elongated arm 32 extending outwardly from the disc-shaped center portion 30. The lever 28 operatively releases a seat back release mechanism and provides an easy to grip handle for moving the seat back. The length of the arm 32 is selected to provide ergonomically acceptable lever effort while actuating the lever 28. Increasing the length of the lever arm 32 tends to decrease the lever effort.

The center portion 30 of the lever 28 is hingedly attached to the seat back 14 at a lever pivot axis, as shown at 34. In this example, the lever 28 is pivotally secured to the seat back frame 22, such as by a pin 36. The attachment location and orientation of the lever on the seat back is preferably selected to allow one-touch, or one hand and motion, actuation by the user. In addition, the attachment location is selected to provide ergonomically acceptable lever effort. By increasing the distance between the axis of rotation 16 of the seat back 14, and the lever pivot axis 34, the lever effort is correspondingly decreased.

The center portion 30 of the lever 28 also includes an attachment means 38 for a cable 40. An example of an attachment means is a pin or the like. Each cable attachment means 38 is positioned radially outboard of the lever pivot axis 34. The placement location is selected to provide ergonomically acceptable lever effort. As the radius between the lever axis and the cable attachment increases, the lever effort decreases. In addition, the angular relationship between the attachment points for each cable influences the lever effort. Preferably, the system 10 includes two cables 40a, 40b and two cable attachment means 38. Each cable 40 operatively controls the seat back travel in one direction. The cable 40 attached to one side of the lever center portion is utilized to operatively actuate a lock release mechanism 42 of the seat back release mechanism 68 when the first cable 40a is rotated clockwise, while the second cable 40b attached to the opposed side of the lever center portion is utilized to operatively actuate the lock release mechanism 42 when the second cable 40b is rotated counterclockwise. It should be appreciated that in this manner, the release mechanism operates in multi-directions.

In should be appreciated that in this example the cable 40 is a push-pull type cable, as is known in the art. Each cable includes an outer housing 46 or sheath, and a wire 48 disposed within the housing. A first end of the wire includes a first attachment means 50 for attaching a first end of the wire 48 to the cable attachment means 38. A second end of the wire 48 includes a second attachment means (not shown) for securing the second end of the wire to the release mechanism 42. A first end of the cable housing also includes a fitting 54 for rigidly supporting a first end of the cable. In this example, the fitting 54 is a cylindrical member with a plurality of concentric flanges 56 for fittingly engaging a cable support bracket 58, in a manner to be described.

As shown in FIG. 5, the cable support bracket 58 is a generally v-shaped member, which in this example is rigidly supported on the seat frame 22. The support bracket is held by a fastening means, such as welding, bolting or the like. It should be appreciated that each leg of the support member may be angled inwards, in order to better position the cable.

Each leg 60 of the support member 58 includes an outer end that is forked, in order to receive the cable fitting 54 within an opening 62. The fitting 54 is retained by the leg portion 60 of the support bracket 58, in order to fixedly support the cable.

The system 10 also includes a cable routing bracket 64. The cable routing bracket 64 is an elongated member having two parallel channels 66 for routing each of the two cables 40. Preferably, the cable routing bracket 64 is rigidly supported on the seat back using a fastening means such as welding, bolting or the like. The cable routing bracket 64 advantageously prevents the two cables from coming into contact with each other. In this example the cable routing bracket 64 is a steel stamping that is welded to the seat back frame. An advantage of this routing bracket 64 is that the cables 40 can cross without interfering with each other's operation.

The system 10 further includes a seat back release mechanism 68. The seat back release mechanism 68 is conventionally known in the art, and is utilized to unlock the seat back 14, so that the seat back 14 pivots about the seat back pivot axis 16 in a predetermined direction. It should be appreciated that each of the cables 40 is separately attached to the seat back release mechanism 68, and each cable 40 controls one direction of pivotal movement of the seat back 14, as previously described.

In operation, one-touch operation of the seat back 14 utilizing one hand is accomplished with the described system 10. The operator rotates the lever arm 32 on the seat back 14 in the desired direction of seat back travel. As the lever 28 is rotated about the lever pivot axis 34, the cable wire 48 attached to the side of the lever opposite the direction of travel is pulled. The pulling action of the cable wire 48 unlocks the seat back release mechanism 68. At the same time, the operator uses the lever arm 32 as a handle to guide to the seat back into the desired position. The rotational direction of the lever advantageously corresponds to the rotational direction of travel of the seat back as shown at 70. The rotational movement of the seat back 14 about the seat back pivot axis 16 in a first direction, may be utilized to fold the seat flat from a raised position, while the rotational movement of the seat back 14 about the seat back pivot axis 16 in a second direction may raise the seat from a folded position. Alternatively, the seat back could be reclined from an upright position. The dual action seat release mechanism 26 advantageously simplifies the operation of the seat back release mechanism 68, since the direction of rotation of the lever 28 is the same as the desired rotation of the seat back 14. In addition, the lever can be visibly seen and accessed from both sides of the seat.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A dual action seat release mechanism for a seat on a vehicle said seat having a vertically oriented seat back portion pivotally connected to a horizontally oriented seat cushion portion comprising:

a lever pivotally attached to said seat back portion of said seat assembly, wherein said lever includes an elongated handle extending from a center portion that is pivotally attached to said seat back portion of said seat assembly at a lever pivot axis;

two cable attachment means disposed on said center portion of said lever, wherein each of said cable attachment means is positioned radially outboard from the lever pivot axis;

a first cable and a second cable each having a first end and a second end, wherein said first end of each of said first cable and said second cable is attached to said corresponding cable attachment means on said lever and said second end of each of said first cable and said second cable is operatively connected to a lock release mechanism;

a cable routing bracket fixedly attached to said seat assembly, and having two parallel elongated channels for receiving the first cable and the second cable;

wherein rotation of said lever in a first direction actuates the cable to operatively pivot said seat back portion in unison with the first direction of rotation of said lever, and rotation of said lever in a second direction actuates said second cable to operatively pivot said seat back portion in unison with the second direction of rotation of said lever.

2. The dual action seat release mechanism of claim 1 wherein said seat back and said seat cushion portions of said seat assembly each includes a frame and a material portion covering said frame and said lever is attached to an upper region of said seat back portion frame.

3. The dual action seat release mechanism of claim 1, further comprising a cable support bracket fixedly attached to said seat back portion of said seat assembly wherein said cable support bracket is v-shaped, and includes a pair of openings each opening for receiving a fitting portion of each of said cables.

4. The dual action seat release mechanism of claim 1 wherein said first attachment means for said first cable is positioned along a first radius, and said second cable attachment means for said second cable is positioned along a second radius, and said first radius and second radius are separated by a predetermined angle relative to the lever pivot axis.

5. A dual action seat back release mechanism for actuating a seat back release mechanism to permit pivotal movement of a seat back of a vehicle in a first rotational direction forwardly and downwardly from an upright position to a folded position; and to permit movement in a second rotational position rearwardly and upwardly from the folded position to the upright position, said seat back release mechanism comprising:

a lever pivotally mounted to an upper portion of said seat back, said lever having an elongated arm extending from a center portion, said elongated arm rotatable in said first and second directions; and a pair of push-pull cables, one end of each of said pair mounted in a spaced apart relationship to said center portion of said lever, an opposite end of each of said pair of cables mounted to the release mechanism such that rotation of the lever arm in the first or second direction actuates the release mechanism, rotation of the arm in the first direction actuates the release mechanism and permits the seat back to be moved in the first direction; rotation of the arm in the second direction actuates the release mechanism and permits the seat back to be moved in the second direction.

6. The dual action seat release mechanism of claim 5 wherein said seat back and said seat cushion portions of said seat assembly each includes a frame and a material portion covering said frame and said lever is attached to an upper region of said seat back portion frame.

7. The dual action seat release mechanism of claim 5 further comprising a first cable and a second cable, and a first end of the first cable and the second cable is attached to a corresponding cable attachment means, and each cable attachment means is positioned radially outboard from the lever pivot axis, such that rotation of said lever in the first direction of rotation actuates the first cable to operatively pivot said seat back portion in unison with the first direction of rotation of said lever and rotation of said lever in a second direction actuates said second cable to operatively pivot said seat back portion in unison with the second direction of rotation of said lever.

8. The dual action seat release mechanism of claim 7, further comprising a cable support bracket fixedly attached to said seat back portion of said seat assembly wherein said cable support bracket is v-shaped, and includes an opening for receiving a fitting portion of each of said cables.

9. The dual action seat release mechanism of claim 8, further comprising a cable routing bracket fixedly aft ached to said seat back portion of said seat assembly wherein said cable routing bracket includes two parallel channels, for receiving the corresponding first and second cables.

10. The dual action seat release mechanism of claim 5, further comprising a cable routing bracket fixedly attached to said seat back portion of said seat assembly wherein said cable routing bracket includes two parallel channels, for receiving the corresponding first and second cables.

11. The dual action seat release mechanism of claim 5, further comprising a cable support bracket fixedly attached to said seat back portion of said seat assembly wherein said cable support bracket is v-shaped, and includes an opening for receiving a fitting portion of each of said cables.

12. The dual action seat release mechanism of claim 5 wherein said first radius and said second radius are separated by a predetermined angle relative to the lever pivot axis.

* * * * *